United States Patent [19]

Milligan

[11] 4,400,128
[45] Aug. 23, 1983

[54] PALLET UNLOADING APPARATUS

[75] Inventor: Timothy H. Milligan, Beaverton, Oreg.

[73] Assignee: Willamette Industries, Inc., Portland, Oreg.

[21] Appl. No.: 256,125

[22] Filed: Apr. 21, 1981

[51] Int. Cl.³ .............................................. B65B 69/00
[52] U.S. Cl. ................................... 414/417; 271/269; 414/46; 414/102
[58] Field of Search ................. 414/417, 416, 46, 102, 414/509; 198/746, 747, 485; 271/225, 184, 269, 84, 142

[56] References Cited

U.S. PATENT DOCUMENTS 3,161,113 12/1964 Walter et al. .................. 271/142 X
3,658,173 4/1972 Conti .................................. 198/746
4,124,114 11/1978 Schmuck ...................... 198/747 X

FOREIGN PATENT DOCUMENTS 2712483 9/1978 Fed. Rep. of Germany ...... 414/417

Primary Examiner—Robert J. Spar
Assistant Examiner—Donald W. Underwood
Attorney, Agent, or Firm—Eugene D. Farley

[57] ABSTRACT

An apparatus for unloading stacked sheet material from a supporting surface such as a pallet. A frame structure is provided including a station for positioning a loaded pallet. A ram reciprocates between an advanced and a retracted position at a height sufficient to pass over the pallet. Sweeping means is mounted on the ram for frictional sweeping engagement with the sheet material and pallet to remove cleanly all of the stack of sheet material.

8 Claims, 5 Drawing Figures

U.S. Patent   Aug. 23, 1983   4,400,128
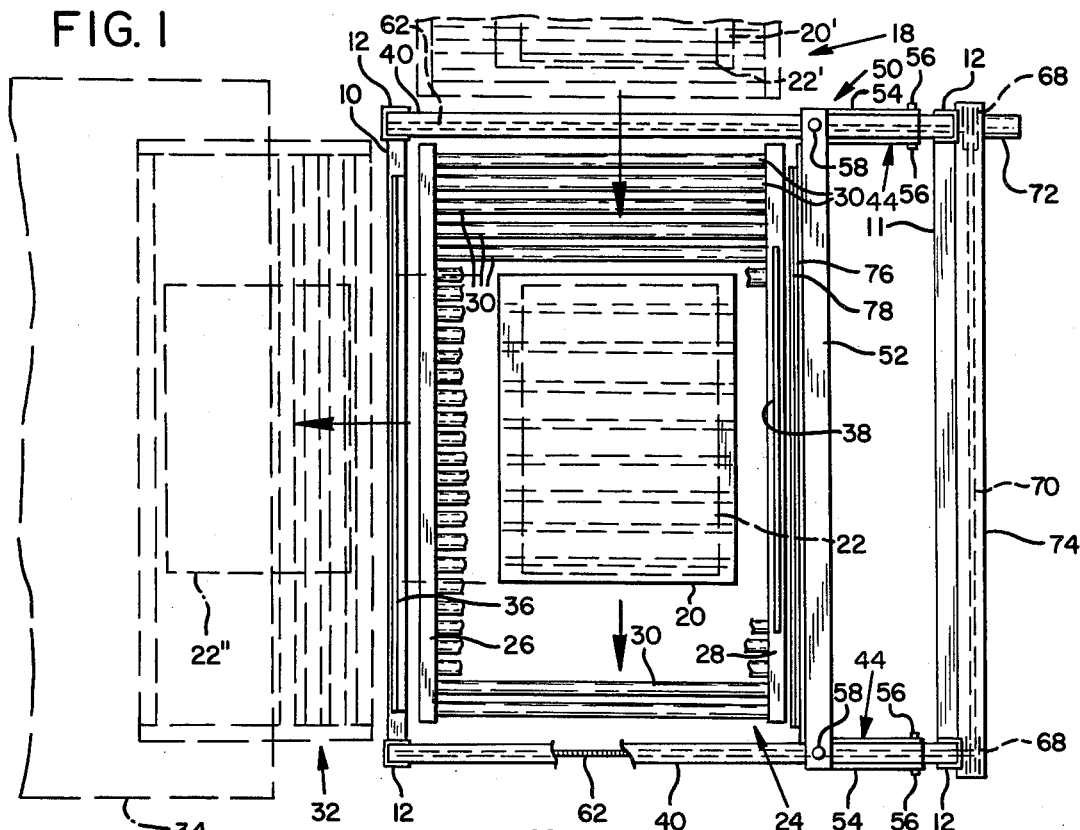
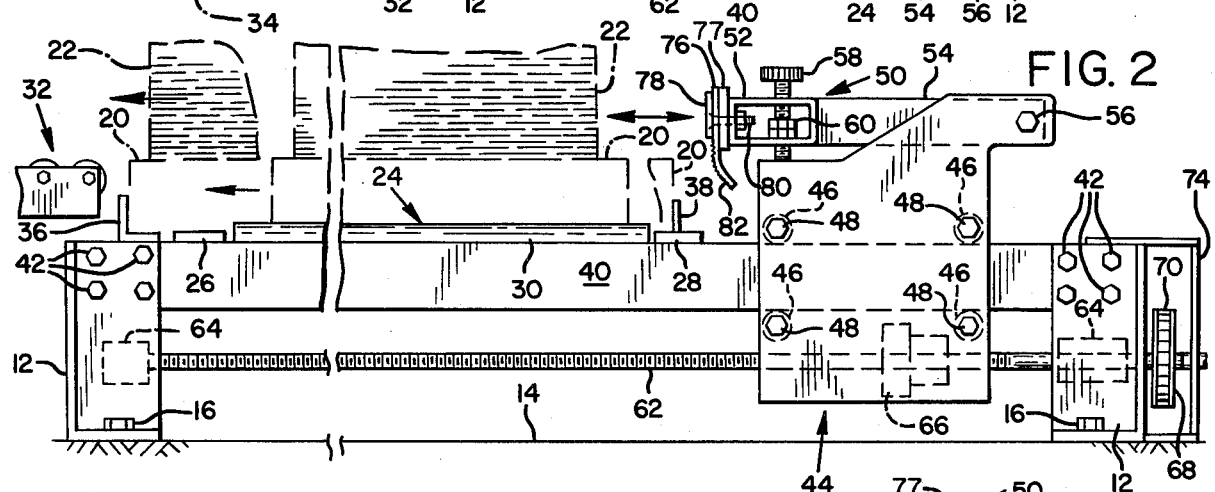
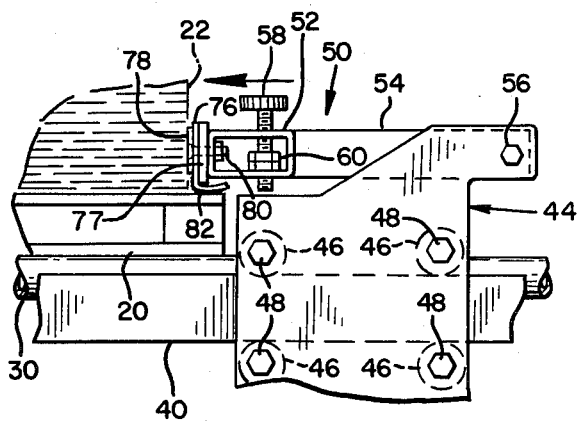

4,400,128

PALLET UNLOADING APPARATUS

BACKGROUND OF THE INVENTION

The present invention relates to an apparatus for unloading stacked sheet material from a supporting surface, and in particular to such an apparatus having a ram and a sweeper mounted on the ram for pushing a stack of sheet material cleanly off a pallet.

In the container manufacturing industry it is common to automate the processing of flat corrugated sheets into cartons by running the sheets through automatic folding machinery. Generally the feed stock for such processing machinery comes in the form of stacks of sheet material on pallets.

Because of friction between the lowermost sheets of the stack and the surface of the pallet it is difficult to remove the entire stack cleanly from the pallet. Further, since pallets vary in size and thickness it is difficult to align the pallets for automatic removal of the stacked sheets.

Accordingly, it is the general object of the present invention to provide an apparatus for unloading stacked sheet material cleanly from a supporting surface such as a pallet.

Another object is to provide such an apparatus which will not disturb the stack of sheets during unloading.

Yet another object is to provide an apparatus which is automatically adjustable for various sizes and thicknesses of pallets.

A further object is to provide automatic positioning or alignment for the pallets so that the stacks of sheets will all be discharged in substantially the same position.

Another object is to provide for sequential unloading of multiple stacks from the same pallet.

A still further object is to provide for the emptied pallets to be discharged in substantially the same position.

Other objects and advantages and the manner in which they are accomplished will become apparent in the following specification and claims.

SUMMARY OF THE INVENTION

In its basic concept, the present invention is an apparatus for unloading stacked sheet material from a supporting surface such as a pallet. A frame structure is provided including a station for positioning the loaded pallet. A ram is mounted on the frame structure to reciprocate between an advanced and a retracted position. The ram is at a height sufficient to pass over the pallet. Sweeping means is mounted on the ram for frictional sweeping engagement with the sheet material and the pallet. Also included is drive means to move the ram forwardly or rearwardly.

In operation, the ram is driven against the bottom sheets of the stack, pushing the sheets off the pallet. The sweeping means frictionally engages the lowermost sheet and cleanly removes all of the stack of sheet material. The ram then cycles back, the empty pallet is discharged and another full pallet is positioned in front of the ram. The cycle then repeats.

BRIEF DESCRIPTION OF THE DRAWINGS

FIG. 1 is a plan view of the pallet unloading apparatus of the present invention.

FIG. 2 is an elevation of the apparatus of FIG. 1.

FIG. 3 is a fragmentary elevation similar to FIG. 2 illustrating the engagement of the ram with a stack of sheets on a pallet.

FIG. 4 is a fragmentary side view of the face of the ram illustrating a first embodiment of a sweeping means.

FIG. 5 is a fragmentary side view similar to FIG. 4 illustrating a second embodiment of a sweeping means.

DESCRIPTION OF THE PREFERRED EMBODIMENTS

As shown in FIG. 1, the pallet unloading apparatus of the present invention comprises a frame structure including front frame member 10 and rear frame member 11. The frame structure is preferably supported on uprights 12 and bolted to floor 14 by bolts 16 (FIG. 2).

A feeder live roll assembly is illustrated generally at 18 in FIG. 1. A fragmentary portion of an incoming pallet 20' and stack of sheet material 22' is shown on the feeder live rolls.

A platform or discharge station live roll assembly is illustrated generally at 24. It comprises roller mounting members 26 and 28 and live rollers 30. Mounting members 26 and 28 are secured to the frame structure. Drive means for the live rollers is not shown.

A sheet material-receiving live roller assembly is shown generally at 32. A discharged stack of sheet material 22" is shown on the receiving live roller. These sheets are positioned to be fed into an apparatus for further processing, e.g. into a machine 34 for folding the sheets into cartons.

FIG. 2 shows a pallet 20 supporting a stack of sheets 22 on rollers 30 of platform live roller assembly 24. A forward stop 36 is mounted on frame member 10 and a rearward stop 38 is mounted on top of roller mounting member 28. Pallet 20 is shown in an alternate position abutting the forward stop and in a second alternate position abutting the rearward stop.

A pair of tracks 40 are mounted on the frame structure by bolts 42. As best shown in FIG. 1, the tracks are parallel, one extending along each side of the pallet as it is positioned at the discharge station.

Each track 40 supports a carriage, shown generally at 44. The carriages are mounted on the tracks by a set of rollers 46 on bolts 48. The carriages are reciprocatable along the length of tracks 40.

A ram 50 is mounted on carriages 44 and is reciprocatable with the carriages. The ram is mounted at a height sufficient to pass over the supporting surface or top of pallet 20. Moving with the carriages, the ram is operable to alternate between an advanced position and a retracted position.

The ram assembly includes an elongated stack-pushing member 52 extending between the carriages, and rearwardly extending arms 54 attached at each end of the stack-pushing member. Pivot means, such as bolts 56, pivotally attach arms 54 to carriages 44 at points rearwardly of the stack-pushing member. The face of the stack-pushing member is thus operable to move upwardly to accommodate pallets of varying height.

Adjustment screws 58 are threaded through lock nuts 60 on the ram and rest on the carriages at points spaced forwardly of pivot 56. The adjustment screws are operable to determine and substantially maintain the minimum height of the face of the ram.

The drive assembly for carriages 44 preferably comprises an elongated drive screw 62 extending along each of tracks 40. The screws are journaled in bearings 64. A traveling nut 66 is attached to each carriage and the associated screw is threaded therethrough. A sprocket 68 is attached to the outer end of each drive screw and a chain 70 is operable to drive and to maintain the rotational synchronization of the sprockets. A motor 72 drives the chain in a forward or rearward direction to advance or to retract the carriages and the ram as desired. Preferably the sprockets and chain drive assembly are mounted inside a housing 74 for safety reasons and also to protect them from dust and dirt.

A first embodiment of a sweeping means is illustrated in FIGS. 2, 3 and 4. It comprises a piece of resiliently flexible belting or similar material 76 attached to the face of elongated stack-pushing member 52. The belting is replaceably secured to member 52 between a backing plate 77 and a retaining plate 78 by means of bolts 80. The piece of belting material need not extend continuously the entire distance across the face of the ram, but may be comprised of several pieces. Preferably its front side is roughened as shown at 82 for frictional sweeping engagement with the sheet material 22 and the top of pallet 20.

A second embodiment of sweeping means is illustrated in FIG. 5. In this embodiment a length of air-inflated fire hose or bladder 84 is provided, mounted on the bottom of stack-engaging member 52 of ram 50. Retaining plates 86 and 88 maintain the bladder in position. The surface of bladder 84 is also roughened and a similar function is performed as with the first embodiment. The bladder may be pressurized, or simply be of a flexibly resilient nature of itself in order to retain its position extending below the face of ram 50.

OPERATION

A pallet 20' of stacked sheet material 22' is placed on feeder live roller 18. The pallet waits in turn at the side of the discharge station until platform live roller assembly 24 is empty. Then the pallet is introduced to the discharge station and is positioned centrally thereof as shown by pallet 20.

Ram 50 then begins to cycle forward, carriages 44 being driven by drive screws 62. The face of the ram and the sweeping means 76 or 84 engage the edge of pallet 20. The pallet is pushed forwardly until it abuts forward stop 36.

Then, faced by increased resistance, ram 50 pivots at 56 and raises, against gravity, to ride on top of pallet 20. As shown in FIG. 3, the stack of sheet material 22 is pressed off the pallet by the face of stack-pushing member 52. At the same time, the sweeping means 76 or 84 frictionally engages the lowermost sheets and pushes them off the pallet, insuring clean removal of the stack from the pallet. Sheets 22 are then discharged onto receiving live roller assembly 32 for further processing in machine 34.

When pallet 20 is empty, ram 50 begins to move back. As the ram returns to its retracted position, the pallet is pulled back by sweeping means 76 or 84 until it abuts rearward stop 38. When the ram is clear of the pallet, live roller assembly 24 advances pallet 20 off of the discharge station to be stacked and returned for further use. It should be noted that all pallets come off in the same position, regardless of the position at which they entered the apparatus.

It can be seen that the present invention lends itself to processing multiple stacks of boxes on one pallet. The ram can be advanced until one stack of sheets enters receiving live roll assembly 32, then paused, and then further advanced to resume its pallet-stripping function.

It should be noted that the disclosed apparatus cleanly unloads the stacked sheet material from its supporting surface, yet does so gently so as not to upset stacks 22.

Automatic positioning is readily achieved by the action of ram 50 and forward and rearward stops 36 and 38. Various size pallets are also accommodated by the pivoting action of ram 50.

Having described my invention in its preferred embodiments, I claim:

1. An apparatus for unloading stacked sheet material from a support comprising:
    (a) a frame structure including a station for positioning the support having the stack of sheet material thereon;
    (b) forward and rearward support-engaging stops on the frame structure for limiting movement of the support in forward and rearward directions,
    (c) a ram reciprocatably mounted on the frame structure at a height sufficient to pass over the support and operable to move between an advanced forward position and a retracted rearward position;
    (d) sweeping means mounted on the ram and extending therebelow for frictional sweeping engagement with the sheet material and the support for pushing the support to its forward stop and then pushing the stack of sheet material from the support to the advanced forward position of the ram and for pulling the support back to its rearward stop; and
    (e) drive means mounted on the frame structure for reciprocating the ram.

2. The apparatus of claim 1 wherein the support comprises a pallet.

3. The apparatus of claim 1 further comprising a pair of tracks, one adjacent each side of the support, and a pair of reciprocatable carriages, one mounted on each track, the ram being mounted on and reciprocatable with the carriages.

4. The apparatus of claim 3 wherein the ram comprises an elongated stack-pushing member extending between the carriages, a rearwardly projecting extension attached at each end of the stack-pushing member, and pivot means for pivoting the ram on the carriages at a point rearwardly of the stack-pushing member, whereby the face of the ram is operable to move upwardly to accommodate supporting surfaces of varying height.

5. The apparatus of claim 3 further comprising an adjustment screw mounted on the ram and resting on one of the carriages to determine and to substantially maintain the height of the face of the ram.

6. The apparatus of claim 3 wherein the drive means comprises a drive screw extending along each of the tracks and engaging the carriages to drive them forwardly or rearwardly.

7. An apparatus for unloading stacked sheet material from a support comprising:
    (a) a frame structure including a station for positioning the support having the stack of sheet material thereon;
    (b) a ram reciprocatably mounted on the frame structure at a height sufficient to pass over the support and operable to move between an advanced position and a retracted position;
    (c) a piece of flexible belting forming sweeping means attached to the face of the ram and extending therebelow for frictional sweeping engagement with the sheet material and the support; and (d) drive means mounted on the frame structure for reciprocating the ram.

8. An apparatus for unloading stacked sheet material from a support comprising:
(a) a frame structure including a station for positioning the support having the stack of sheet material thereon;
(b) a ram reciprocatably mounted on the frame structure at a height sufficient to pass over the support and operable to move between an advanced position and a retracted position;
(c) a bladder of rough material forming sweeping means mounted on the underside of the ram and extending therebelow for frictional sweeping engagement with the sheet material and the support; and
(d) drive means mounted on the frame structure for reciprocating the ram.

* * * * *